(12) United States Patent
Ono et al.

(10) Patent No.: US 10,519,908 B2
(45) Date of Patent: Dec. 31, 2019

(54) DEVICE FOR SUPPLYING FUEL TO ENGINE

(71) Applicant: Kubota Corporation, Osaka-shi (JP)

(72) Inventors: Akiyoshi Ono, Sakai (JP); Takahiro Hisada, Sakai (JP); Mamoru Kawaguchi, Sakai (JP); Daisuke Yasunobe, Sakai (JP); Norifumi Adachi, Sakai (JP); Hisashi Tsukatani, Sakai (JP); Mitsuhisa Kanata, Sakai (JP)

(73) Assignee: Kubota Corporation, Osaka (JP)

( * ) Notice: Subject to any disclaimer, the term of this patent is extended or adjusted under 35 U.S.C. 154(b) by 380 days.

(21) Appl. No.: 15/477,877

(22) Filed: Apr. 3, 2017

(65) Prior Publication Data

US 2017/0204822 A1  Jul. 20, 2017

Related U.S. Application Data

(62) Division of application No. 13/786,586, filed on Mar. 6, 2013, now abandoned.

(30) Foreign Application Priority Data

Mar. 14, 2012 (JP) ................................ 2012-057801
Mar. 16, 2012 (JP) ................................ 2012-060824

(51) Int. Cl.
 *F02M 37/00* (2006.01)
 *F02M 37/24* (2019.01)
 (Continued)

(52) U.S. Cl.
 CPC ............ *F02M 37/24* (2019.01); *F02M 31/20* (2013.01); *F02M 37/0052* (2013.01);
 (Continued)

(58) Field of Classification Search
 CPC ............... F02M 31/16; F02M 37/0052; F02M 37/0088; B60K 15/01
 See application file for complete search history.

(56) References Cited

U.S. PATENT DOCUMENTS 2,599,699 A * 6/1952 Dilworth ................ F02M 37/20
 123/514
3,768,454 A * 10/1973 Markland .............. F02M 31/16
 123/552
(Continued)

FOREIGN PATENT DOCUMENTS

DE  10026373 A1  11/2001
JP  57-110755 A  7/1982
(Continued)

OTHER PUBLICATIONS

"Six Elements Reunis Dans Un Module D'Alimentation", Revue Technique Automobile, Boulogne-Billancourt, FR, vol. 50 No. 578, Nov. 1, 1995.

*Primary Examiner* — David Hamaoui
(74) *Attorney, Agent, or Firm* — The Webb Law Firm

(57) ABSTRACT

A merge and discharge unit has: a reservoir unit in which fuel can be collected; a first merge unit for merging into the reservoir unit the fuel from an upstream site upstream of the merge and discharge unit on a fuel supply route; a second merge unit for merging into the reservoir unit the fuel from a first fuel return route; a first discharge unit for discharging a portion of the fuel of the reservoir unit into a downstream site downstream of the merge and discharge unit on the fuel supply route; and a second discharge unit for discharging a remaining portion of the fuel of the reservoir unit into a second fuel return route.

11 Claims, 10 Drawing Sheets

(51) Int. Cl.
   *F02M 37/22*     (2019.01)
   *F02M 31/20*     (2006.01)
   *F02M 37/04*     (2006.01)
(52) U.S. Cl.
   CPC ............ *F02M 37/04* (2013.01); *F02M 37/22* (2013.01); *Y10T 137/85978* (2015.04)

(56) References Cited

U.S. PATENT DOCUMENTS

| | | | |
|---|---|---|---|
| 4,353,847 A | | 10/1982 | Sato et al. |
| 4,452,213 A | * | 6/1984 | Duprez ................ F02M 31/16 |
| | | | 123/514 |
| 4,479,465 A | * | 10/1984 | Flynn ................ F02M 37/0029 |
| | | | 123/514 |
| 4,502,451 A | * | 3/1985 | Duprez ................ F02M 31/16 |
| | | | 123/514 |
| 4,651,701 A | | 3/1987 | Weaver |
| 4,659,346 A | | 4/1987 | Uranishi et al. |
| 4,703,771 A | | 11/1987 | Mimura |
| 4,933,093 A | * | 6/1990 | Keller ................ B01D 17/0208 |
| | | | 210/774 |
| 5,197,443 A | * | 3/1993 | Hodgkins ........... B60K 15/077 |
| | | | 123/510 |
| 5,518,017 A | | 5/1996 | Snook, Jr. |
| 5,579,740 A | * | 12/1996 | Cotton ................ F02M 25/0854 |
| | | | 123/514 |
| 5,740,784 A | * | 4/1998 | McKinney ........... B60K 15/077 |
| | | | 123/509 |
| 5,832,902 A | * | 11/1998 | Davis ................ F02D 33/006 |
| | | | 123/514 |
| 5,924,445 A | | 7/1999 | Ambrose et al. |
| 6,058,964 A | | 5/2000 | Cotton et al. |
| 6,112,725 A | | 9/2000 | McKinney |
| 6,289,879 B1 | * | 9/2001 | Clausen ................ F02M 31/16 |
| | | | 123/514 |
| 6,453,884 B2 | | 9/2002 | Ushigome |
| 6,920,866 B2 | * | 7/2005 | Leini ................ B60K 15/03 |
| | | | 123/514 |
| 7,134,568 B2 | | 11/2006 | Moriyama et al. |
| 7,182,071 B2 | * | 2/2007 | Hansson ................ B60K 15/03 |
| | | | 123/514 |
| 7,493,893 B2 | * | 2/2009 | Funabashi ............ F02D 33/006 |
| | | | 123/457 |
| 8,857,160 B2 | | 10/2014 | Haeberer |
| 2004/0003796 A1 | | 1/2004 | Nomura |
| 2007/0125345 A1 | | 6/2007 | Mizui et al. |
| 2011/0232271 A1 | | 9/2011 | Haeberer |
| 2015/0007899 A1 | | 1/2015 | Ekstam |
| 2018/0128219 A1 | * | 5/2018 | Kapp ................ F02M 37/0035 |

FOREIGN PATENT DOCUMENTS

| | | |
|---|---|---|
| JP | 57-131858 A | 8/1982 |
| JP | 57-202745 U1 | 12/1982 |
| JP | 62-197766 U | 12/1987 |
| JP | 2001-012326 A | 1/2001 |
| JP | 2004-278526 A | 10/2004 |
| JP | 2006-329101 A | 12/2006 |
| JP | 2007-016658 A | 1/2007 |
| JP | 2010-007487 A | 1/2010 |
| JP | 2010-156273 A | 7/2010 |
| KR | 2019980015799 U | 6/1998 |
| WO | 2005/083258 A1 | 9/2005 |
| WO | 2010/078991 A1 | 7/2010 |

* cited by examiner

DEVICE FOR SUPPLYING FUEL TO ENGINE

CROSS REFERENCE TO RELATED APPLICATIONS

This application is a divisional of U.S. application Ser. No. 13/786,586 filed Mar. 6, 2013, which claims priority to Japanese Patent Application No. 2012-060824 filed Mar. 16, 2012 and Japanese Patent Application No. 2012-057801 filed Mar. 14, 2012, the disclosures of which are each hereby incorporated in their entirety by reference.

BACKGROUND OF THE INVENTION

Field of the Invention

The present invention relates to a device for supplying fuel to an engine, the fuel supply device being provided with a fuel supply route for supplying an engine with fuel collected in a fuel tank, and a filter and a first fuel pump being provided to the fuel supply route in the stated order from the upstream side of a fuel supply direction.

Description of Related Art

In a fuel supply device of such description, impurities included in the fuel are removed by the filter provided to the fuel supply route, and the fuel from which the impurities have been removed is supplied to the engine. Also, a fuel return route for returning fuel coming from the engine to the fuel tank is provided, so that surplus fuel in the engine is returned to the fuel tank by the fuel return route.

In the fuel supply device of such description, although the impurities are removed by the filter, in a case where low-temperature fuel is being supplied to the filter, such as initial start-up of the engine when in a cold climate, a problem emerges in that deposited matter or the like is created from the fuel and the filter is clogged by the deposited matter.

In view whereof, in a conventional fuel supply device, an interconnecting flow path that creates communication between a midway site of the fuel supply route and a midway site of the fuel return route is provided, and a circulation valve of a temperature-sensitive displacement type is provided to the interconnecting flow path (see, for example, Japanese Laid-open Patent Application 2007-16658).

In the apparatus described in Japanese Laid-open Patent Application 2007-16658, the circulation valve opens the interconnecting flow path in a case where the fuel temperature is less than a predetermined temperature, whereby the comparatively higher-temperature fuel returning from the engine to the fuel tank is admixed into the fuel coming from the fuel tank and is supplied to the filter. The temperature of the fuel being supplied to the filter is thereby elevated, thus preventing clogging of the filter. Also, the circulation valve closes off the interconnecting flow path in a case where the fuel temperature is the predetermined value or greater, whereby the full amount of surplus fuel coming from the engine is returned to the fuel tank.

SUMMARY OF THE INVENTION

In the apparatus described in Japanese Laid-open patent Application 2007-16658, because preventing the clogging of the filter necessitates the furnishing of the circulation valve, which has a temperature-sensitivity displacement body made of a bimetal or the like, there is a corresponding increase in costs and in the complexity of the configuration.

In view of the foregoing, there has been demand for a fuel supply device for an engine that makes it possible to prevent clogging of a filter.

A device for supplying fuel to an engine, as in the present invention, comprises: a fuel tank; a fuel supply route for supplying to the engine fuel that has been collected in the tank; a filter provided to the fuel supply route; a first fuel pump provided downstream of the filter in a fuel supply direction on the fuel supply route; a merge and discharge unit for merging and discharging fuel, the merge and discharge unit being provided to a site between the fuel tank and the filter on the fuel supply route; a first fuel return route for returning the fuel of the engine to the merge and discharge unit; and a second fuel return route for returning to the fuel tank the fuel discharged from the merge and discharge unit; wherein: the merge and discharge unit has: a reservoir unit in which fuel can be collected; a first merge unit for merging into the reservoir unit the fuel from a site upstream of the merge and discharge unit on the fuel supply route; a second merge unit for merging into the reservoir unit the fuel from the first fuel return route; a first discharge unit for discharging a portion of the fuel in the reservoir unit to a site downstream of the merge and discharge unit on the fuel supply route; and a second discharge unit for discharging a remaining portion of the fuel in the reservoir unit into the second fuel return route.

According to this characteristic configuration, the fuel from the fuel tank is supplied to the merge and discharge unit by the upstream site of the fuel supply route, and the fuel from the engine is returned to the merge and discharge unit by the first fuel return route. In the merge and discharge unit, the fuel from the fuel tank is supplied to the reservoir unit by the first merge unit, the fuel from the engine is merged into the reservoir unit by the second merge unit, and the merged fuel is collected in the reservoir unit. Then, in the merge and discharge unit, a portion of the fuel collected in the reservoir unit is discharged to the downstream site of the fuel supply route by the first discharge unit, and a remaining portion is discharged to the second fuel return route by the second discharge unit.

In this manner, the merge and discharge unit makes it possible to merge the fuel from the engine into the fuel from the fuel tank, and possible to supply the merged fuel to the filter by way of the downstream site of the fuel supply route. Thus, even at such times as the initial start-up of the engine in a cold climate, it is accordingly possible to merge fuel that has been heated by heat generated from the engine or the like into the low-temperature fuel from the fuel tank and supply comparatively high-temperature fuel to the filter, thus making it possible to prevent clogging of the filter. As a result, a circulation valve can be obviated; only the merge and discharge unit need be provided, thus making it possible to prevent clogging of the filter without incurring an increase in cost or in complexity of the configuration.

However, of the fuel that is collected in the reservoir unit of the merge and discharge unit, a remaining portion other than what is discharged to the downstream site of the fuel supply route is discharged to the second fuel return route by the second discharge unit and is returned to the fuel tank. This makes it possible to also properly return surplus fuel of the engine to the fuel tank, while it is also possible to prevent clogging of the filter.

In the foregoing configuration, preferably, the amount of fuel discharged from the second discharge unit is less than the amount of fuel discharged from the first discharge unit.

According to this characteristic configuration, of the fuel that is collected in the reservoir unit in the merge and discharge unit, the flow rate of fuel discharged from the second discharge unit and returned to the fuel tank is less than the flow rate of fuel discharged from the first discharge unit and supplied to the filter and to the engine. Because the flow rate of fuel supplied to the merge and discharge unit by the upstream site of the fuel supply route is an amount corresponding to the flow rate of fuel returned to the fuel tank from the merge and discharge unit, it is possible to also lessen the flow rate of fuel supplied to the merge and discharge unit from the fuel tank. This makes it possible to further increase the flow rate by which the fuel from the engine is merged into the fuel from the fuel tank, and possible to properly elevate the fuel temperature of the fuel being supplied to the filter, thus properly preventing clogging of the filter.

In the foregoing configuration, preferably, in causing the amount of fuel discharged from the second discharge unit to be less than the amount of fuel discharged from the first discharge unit, a constricted site where the flow path cross-sectional area is less than that of the first discharge unit is provided to the second discharge unit, or a constricted site where the flow path cross-sectional area is less than that of the downstream site on the fuel supply route is provided to the second fuel return route.

According to this characteristic configuration, for example, causing the flow path cross-sectional area of the second discharge unit to be less than the flow path cross-sectional area of the first discharge unit makes it possible to provide the constricted site to the second discharge unit. Similarly, causing the flow path cross-sectional area of the second fuel return route to be less than the flow path cross-sectional area of the downstream site on the fuel supply route makes it possible to provide the constricted site to the second fuel return route.

Merely by thus employing the simple configuration of providing the constricted site to the second discharge unit or the second fuel return route, it is possible to cause the amount of fuel discharged from the second discharge unit to be less than the amount of fuel discharged from the first discharge unit.

In the foregoing configuration, preferably, the first merge unit, the second merge unit, and the first discharge unit of the merge and discharge unit are arranged in sites below the reservoir unit, and the second discharge unit is arranged at a site above the reservoir unit.

According to this characteristic configuration, in a case where air is included in the fuel, the supply of the fuel to the reservoir unit makes it possible for the air included in the fuel to rise to the site above the reservoir unit and be discharged from the second discharge unit. Thus, even when air is included in the fuel being supplied to the engine, this makes it possible to properly remove the air with the merge and discharge unit.

In the foregoing configuration, preferably, a moisture removal unit for removing moisture included in the fuel is arranged at a site between the fuel tank and the merge and discharge unit on the fuel supply route.

According to this characteristic configuration, it is possible to supply to the engine fuel after moisture include therein has been removed by the moisture removal unit, and fuel that does not include moisture can be properly supplied to the engine. Also, as described above, causing the amount of fuel discharged from the second discharge unit to be less than the amount of fuel discharged from the first discharge unit makes it possible to lessen the flow rate of fuel supplied to the merge and discharge unit by the upstream site of the fuel supply route, and thus it is possible to reduce the processing capability required for the moisture removal unit, and the size and cost of the moisture removal unit can be successfully lowered.

In the foregoing configuration, preferably, a cooling unit for cooling the fuel is arranged at a site between the merge and discharge unit and the filter on the fuel supply route.

According to this characteristic configuration, in a case where the fuel temperature is an excessively high temperature, cooling the fuel with the cooling unit makes it possible to lower the fuel temperature of the fuel being supplied to the engine to a desired temperature range. Moreover, as described above, providing the merge and discharge unit causes the fuel from the engine to be merged into the fuel from the fuel tank, and thus in a case where, for example, the engine is continuously operated, it is conceivably possible that the fuel temperature of the fuel being discharged from the merge and discharge unit may reach an excessively high temperature. In view whereof, providing the cooling unit to the site between the merge and discharge unit and the filter on the fuel supply route, as in this characteristic configuration, makes it possible to cool the fuel temperature of the fuel being supplied to the engine to a desirable temperature range, even when the fuel temperature of the fuel being discharged from the merge and discharge unit is an excessively high temperature.

In the foregoing configuration, preferably, a moisture removal unit for removing moisture included in the fuel, a second fuel pump, the merge and discharge unit, a cooling unit for cooling the fuel, a third fuel pump, the filter, and the first fuel pump are provided to the fuel supply route in the stated order from the upstream side in the fuel supply direction.

According to this characteristic configuration, the moisture removal unit is provided to the upstream site on the fuel supply route, as is the second fuel pump. Then, as described above, causing the amount of fuel discharged from the second discharge unit to be less than the amount of fuel discharged from the first discharge unit makes it possible to lessen the fuel flow rate being supplied to the merge and discharge unit by the upstream site of the fuel supply route, and thus it is possible to reduce the processing capability required for the moisture removal unit, and the size and cost of the moisture removal unit can be successfully lowered, while also the capacity required for the second fuel pump, too, can be reduced, and the size and cost of the second fuel pump can be successfully lowered. Additionally, because the cooling unit is also provided, the fuel temperature of the fuel being supplied to the engine can be cooled to a desired temperature range even when the fuel temperature of the fuel being discharged from the merge and discharge unit reaches an excessively high temperature, as described above.

A device for supplying fuel to an engine, as in the present invention, comprises: a fuel tank, the fuel tank including: a bottom; a recessed reservoir unit for collecting fuel, the recessed reservoir unit being recessed so as to be lower than other portions on the bottom; a covering for covering the recessed reservoir unit in a state where the fuel is permitted to flow into the recessed reservoir unit; and an intake unit for taking in and drawing out fuel inside the fuel tank, above the bottom of the fuel tank.

According to this configuration, because the recessed reservoir unit is provided to the bottom of the fuel tank, fuel can be kept collected in the recessed reservoir unit even when there is a lesser amount of fuel. Also, because the covering covers the recessed reservoir unit, the covering makes it possible to prevent the fuel that is collected in the recessed reservoir unit from flowing outwardly therefrom, even when the fuel tank is swung in the left/right direction and in the front/rear direction. The fuel can accordingly be kept collected in the recessed reservoir unit even when the fuel tank is swung in the left/right direction and in the front/rear direction in a case where there is a lesser amount of fuel. Because the intake unit takes in and draws out the fuel that is collected in the recessed reservoir unit, the fuel can be properly taken in without also taking in air, even when there is a lesser amount of fuel in the fuel tank.

In the foregoing configuration, preferably, the covering is adapted so as to cover a middle site of the recessed reservoir unit as seen in plan view.

According to this configuration, because the covering covers the middle site of the recessed reservoir unit, a spacing can be formed between an outer peripheral part of the covering and an inner peripheral part of the recessed reservoir unit, across the full length of the outer periphery of the covering. Therefore, fuel can be permitted to flow into the recessed reservoir unit from the spacing, and even when there is a lesser amount of fuel, the fuel can be properly kept collected in the recessed reservoir unit.

In the foregoing configuration, preferably, the intake unit is supported by the covering, and is configured so that the covering supporting the intake unit can be inserted into or removed from the fuel tank.

According to this configuration, merely mounting the covering supporting the intake unit onto the fuel tank makes it possible for the intake unit and the covering to be mounted together, and allows for the intake unit and the covering to be easily mounted. In a case where the intake unit and the covering are to be removed, the intake unit and the covering can similarly be removed together. Moreover, because the intake unit is supported by the covering, merely adjusting the position where the intake unit is supported by the covering makes it possible to adjust the relationship between the relative positions of the intake unit and the covering. This makes it possible to readily mount the recessed reservoir unit and the intake unit at proper positions, by mounting the covering supporting the intake unit onto the fuel tank after having adjusted the position where the intake unit is supported by the covering.

In the foregoing configuration, preferably, the covering is constituted of a cylindrical body having a hollow space that communicates with the recessed reservoir unit, and a lower end of the cylindrical body is formed so as to be smaller than the recessed reservoir unit when seen in plan view and is inserted into the interior of the recessed reservoir unit.

According to this configuration, because the cylindrical body serving as the covering is arranged so that the lower end thereof is inserted into the interior of the recessed reservoir unit, the presence of the cylindrical body having been inserted into the interior of the recessed reservoir unit makes it possible to prevent swinging of the liquid level of the fuel that is collected in the recessed reservoir unit, even when the fuel tank is swung in the left/right direction and the front/rear direction. It is accordingly possible to reliably prevent the fuel that is inserted into the interior of the recessed reservoir unit, thus making it possible to ensure a correspondingly greater capacity of fuel that is taken in by the intake unit.

In the foregoing configuration, preferably, an air discharge unit enabling air in the hollow space to be discharged to the exterior of the cylindrical body is provided to an upper site of the cylindrical body.

According to this configuration, even when air is included in the fuel that is collected in the recessed reservoir unit, it is possible for the air to rise through the hollow space of the cylindrical body and be discharged to the exterior of the cylindrical body by the air discharge unit. This makes it possible to remove air by using the cylindrical body, and therefore makes it possible to properly prevent air from being taken in by the intake unit.

BRIEF DESCRIPTION OF THE DRAWING(S)

DESCRIPTION OF THE INVENTION

Detailed Description of the Preferred Embodiments

First Embodiment

Embodiments of a fuel supply device for an engine as in the present invention shall be described on the basis of the accompanying drawings.

Figure 1:
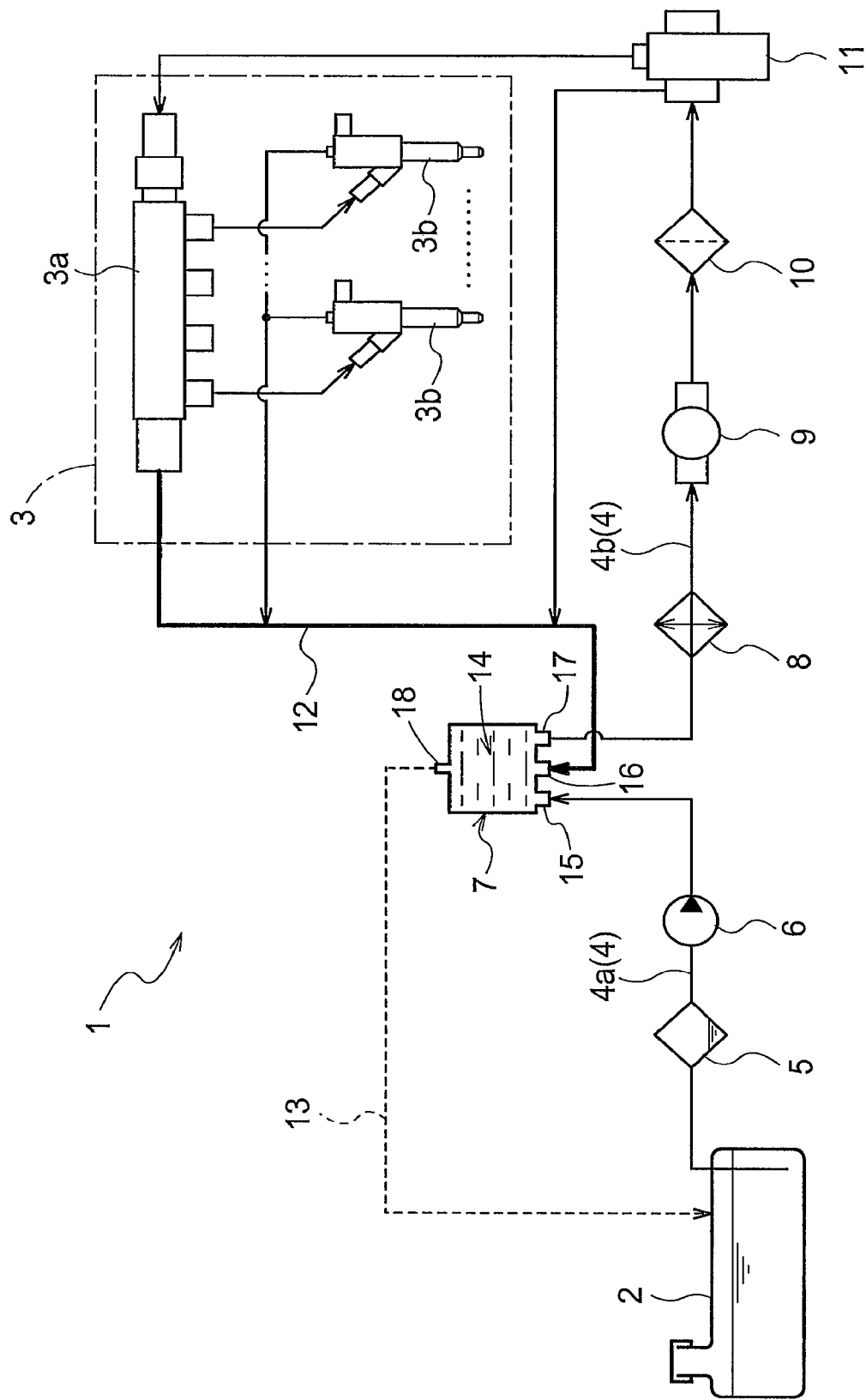
FIG. 1 is a schematic configuration diagram of a device for supplying fuel to an engine.

A fuel supply device 1 for an engine, as illustrated in FIG. 1, is provided with a fuel supply route 4 for supplying to an engine 3 fuel that is collected in a fuel tank 2. Provided to the fuel supply route 4 are a moisture removal unit 5, an electromagnetic pump 6 (equivalent to a second fuel pump), a merge and discharge unit 7, a cooling unit 8, a feed pump 9 (equivalent to a third fuel pump), a filter 10, and a supply pump 11 (equivalent to a first fuel pump), in the stated order from the upstream side in a fuel supply direction.

The engine 3 is, for example, a common-rail diesel engine provided with a rail 3 and a plurality of injectors 3b, and is adapted to be capable of electronically controlling the amount of fuel injection and the injection timing. The moisture removal unit 5 is, for example, a sedimenter, and is adapted to remove moisture that is included in the fuel. The merge and discharge unit 7 is adapted to merge and discharge fuel flows. The cooling unit 8 is, for example, a cooler, and is adapted to cool the fuel. The filter 10 is adapted to remove impurities that are included in the fuel.

The fuel of the fuel supply route 4 firstly undergoes moisture removal by the moisture removal unit 5 and is pressurized by the electromagnetic pump 6, supplied to the cooling unit 8, and cooled in the cooling unit 8 to a desired temperature range. The fuel, having reached the desired temperature range, is pressurized by the feed pump 9 and is supplied to the filter 10; the impurities are removed by the filter 10. The fuel from which the impurities have been removed is pressurized by the supply pump 11 and supplied to the rail 3a of the common-rail engine 3.

In the fuel supply device 1, not only is the fuel supplied to the engine 3 via the fuel supply route 4, but also provided are a first fuel return route 12 via which the fuel of the engine 3 is returned to the merge and discharge unit 7 and a second fuel return route 13 via which the fuel discharged from the merge and discharge unit 7 is returned to the fuel tank 2. Herein, the fuel of the engine 3 that returns to the merge and discharge unit 7 by way of the first fuel return route 12 is an amount commensurate with the surplus with respect to the amount that is required in the engine 3, and would be, for example, surplus fuel from the rail 3a and injector 3b of the common-rail engine 3 as well as surplus fuel from the supply pump 11.

The configuration of such description thus, by being provided with the first fuel return route 12 and the second fuel return route 13, makes it possible for the surplus fuel in the engine 3 to be returned to the fuel tank 2 by way of the first fuel return route 12, the merge and discharge unit 7, and the second fuel return route 13. Further, by being provided with the merge and discharge unit 7, the configuration also makes it possible to merge one portion of the surplus fuel in the engine 3 with the fuel from the fuel tank 2 and to circulate the resulting confluence for supply to the engine 3, as well as to return to the fuel tank 2 a remaining portion surplus fuel in the engine 3.

The merge and discharge unit 7 shall now be described. As illustrated in FIG. 1, there are four flow paths that are connected to the merge and discharge unit 7, namely, that of an upstream site 4a further upstream than the merge and discharge unit 7 in the fuel supply route 4, that of the first fuel return route 12, that of a downstream site 4b further downstream than the merge and discharge unit 7 in the fuel supply route 4, and that of the second fuel return route 13. The merge and discharge unit 7 accepts and merges fuel from the upstream site 4a of the fuel supply route 4 and fuel from the first fuel return route 12, and discharges the merged fuels to the downstream site 4b of the fuel supply route 4 and to the second fuel return route 13.

Figure 2:
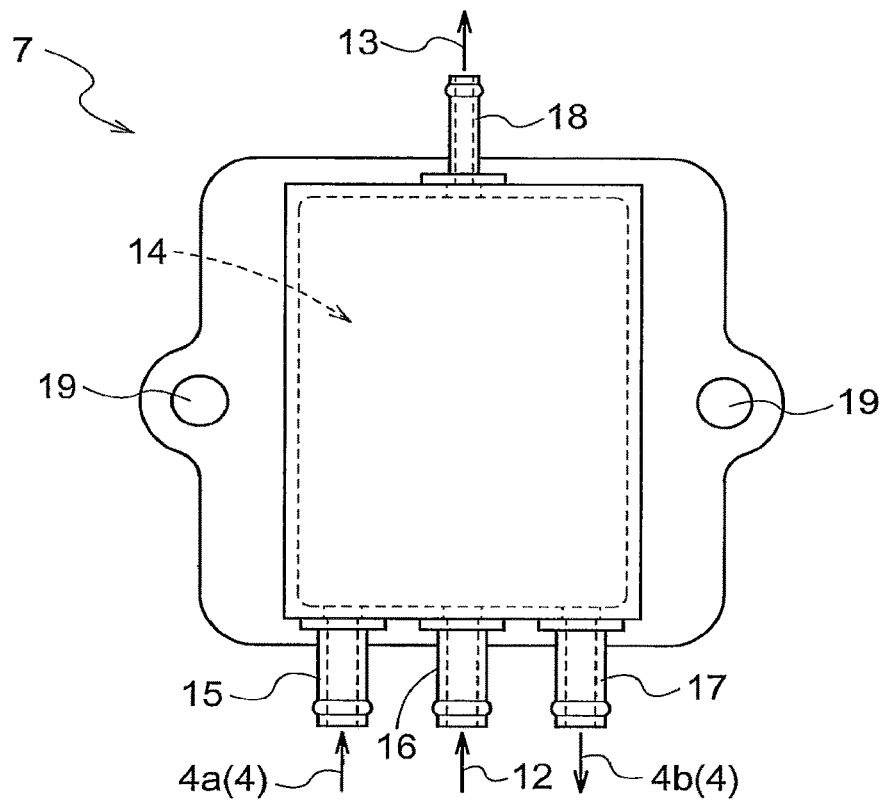
FIG. 2 is a front view of a merge and discharge unit.
Figure 3:
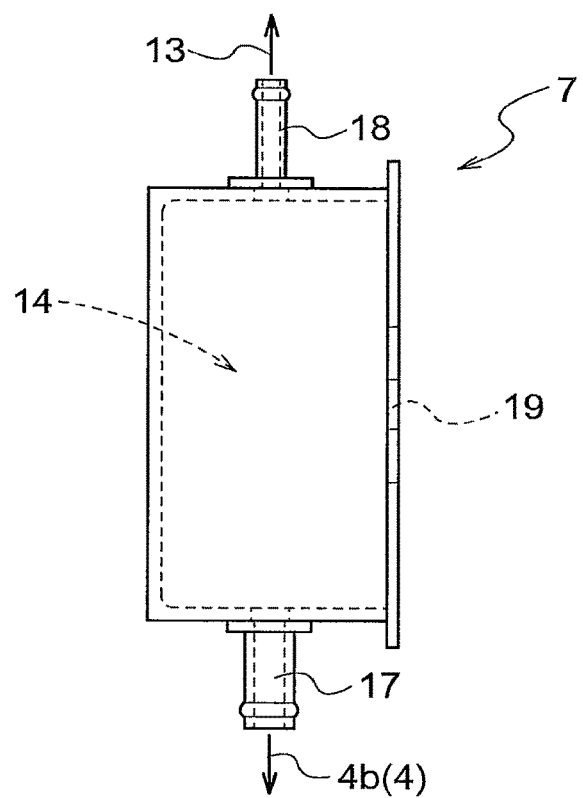
FIG. 3 is a side view of a merge and discharge unit.

As illustrated in FIGS. 2 and 3, the merge and discharge unit 7 is provided with: a reservoir unit 14 in which fuel can be collected; a first merge unit 15 for merging into the reservoir unit 14 the fuel from the upstream site 4a of the fuel supply route 4; a second merge unit 16 for merging into the reservoir unit 14 the fuel from the first fuel return route 12; a first discharge unit 17 for discharging a portion of the fuel of the reservoir unit 14 into the downstream site 4b of the fuel supply route 4; and a second discharge unit 18 for discharging a remaining portion of the fuel of the reservoir unit 14 into the second fuel return route 13. FIG. 2 is a front view of the merge and discharge unit 7, and FIG. 3 is a side view of the merge and discharge unit 7.

The merge and discharge unit 7 is configured by combining a recessed member and a planar member, a hollow space in the shape of a cuboid being formed in the interior thereof; the hollow space serves as the reservoir unit 14. The reservoir unit 14 is formed in a vertically long shape, of greater length in the vertical direction, and is adapted to be capable of collecting enough to be capable of ensuring a fuel flow rate required by the engine 3. A hole part 19 for attachment is also provided to both lateral sides of the reservoir unit 14; inserting and fastening a bolt to the hole parts 19 for attachment enables attachment to a desired location.

The first merge unit 15, the second merge unit 16, the first discharge unit 17, and the second discharge unit 18 are all formed in a cylindrical shape, a hollow space in the interior thereof being in communication with the reservoir unit 14. Further, the first merge unit 15, the second merge unit 16, and the first discharge unit 17 are arranged at sites on the lower side of the reservoir unit 14 (a lower end), and the second discharge unit 18 is arranged at a site on the upper side of the reservoir unit 14 (an upper end). This gives a configuration such that air that is included in the fuel rises to the site on the upper side of the reservoir unit 14 and is discharged from the second discharge unit 18. Thus, though air may be included in the fuel being supplied to the engine 3, it is accordingly possible to remove air in the merge and discharge unit 7.

Holes in the cylindrical sites of the first merge unit 15, the second merge unit 16, and the first discharge unit 17 are formed at a first hole diameter, and a hole in the cylindrical site of the second discharge unit 18 is formed to a second hole diameter that is smaller than the first hole diameter. The second discharge unit 18 is thereby provided with a constricted site where the flow path cross-sectional area is smaller than that of the first discharge unit 17, and providing the constricted site of such description gives a configuration such that the amount of fuel discharged from the second discharge unit 18 is less than the amount of fuel discharged from the first discharge unit 17.

Herein, adjusting the extent to which the second hole diameter is smaller than the first hole diameter makes it possible to adjust the extent to which the amount of fuel discharged from the second discharge unit 18 is less than the amount of fuel discharged from the first discharge unit 17. Thus, merely the simple adjustment of adjusting the hole diameter makes it possible to adjust the magnitude of flow rates for the amount of fuel being supplied to the engine 3 from the merge and discharge unit 7 and for the amount of fuel being returned to the fuel tank 2 from the merge and discharge unit 7.

The flow of fuel in the fuel supply device 1 shall now be described. As illustrated in FIG. 1, the fuel of the fuel tank 2 is supplied to the engine 3 by way of the fuel supply route 4, and surplus fuel in the engine 3 is returned to the merge and discharge unit 7 of the fuel supply route 4 by way of the first fuel return route 12. Then, in the merge and discharge unit 7, the surplus fuel in the engine 3 is supplied by the second merge unit 16 to the reservoir unit 14 and the fuel of the fuel tank 2 is supplied by the first merge unit 15 to the reservoir unit 14, the surplus fuel and the fuel being merged together and collected in the reservoir unit 14. The fuel collected in the reservoir unit 14 is discharged from both the first discharge unit 17 and the second discharge unit 18. Thereby, in the merge and discharge unit 7, the fuel from the fuel tank 2 supplied by the upstream site 4a of the fuel supply route 4 is merged into the surplus fuel having been returned by the first fuel return route 12; a portion of the merged fuel is supplied to the engine 3 by the downstream site 4b of the fuel supply route 4, and a remaining portion of the fuel is returned to the fuel tank 2 by the second fuel return route 13.

Thus, merely by providing the merge and discharge unit 7 to a site between the fuel tank 2 and the filter 10 in the fuel supply route 4 makes it possible to merge the surplus fuel in the engine 3 into the fuel from the fuel tank 2 and supply the merged fuels to the filter 10. Even at such times as the initial start-up of the engine 3 in a cold climate, it is accordingly possible to merge fuel that has been heated by heat generated from the engine 3 or the like into the low-temperature fuel from the fuel tank 2 and supply comparatively high-temperature fuel to the filter 10, thus making it possible to prevent clogging of the filter 10.

Because the fuel flow rate that is supplied to the merge and discharge unit 7 by the upstream site 4a of the fuel supply route 4 is an amount corresponding to the fuel flow rate that is returned to the fuel tank 2 from the merge and discharge unit 7, causing the amount of fuel discharged from the second discharge unit 18 to be less than the amount of fuel discharged from the first discharge unit 17 in the merge and discharge unit 7 makes it possible to also lessen the fuel flow rate being supplied to the merge and discharge unit 7 from the fuel tank 2. It is accordingly possible to properly increase the fuel temperature of the fuel being supplied to the filter 10, and possible to reliably prevent clogging of the filter 10.

Also, because the amount of fuel being supplied to the merge and discharge unit 7 from the upstream site 4a of the fuel supply route 4 can be lessened, the flow rate intended to be processed by the moisture removal unit 5 can be lessened, making it possible to reduce the processing capability required for the moisture removal unit 5, and also the required capacity for the electromagnetic pump 6 can be reduced. It is accordingly possible to successfully lower the sizes and costs of the moisture removal unit 5 and the electromagnetic pump 6.

The fuel that is returned to the merge and discharge unit 7 by way of the first fuel return route 12 is surplus fuel in the engine 3, and this surplus fuel is supplied in circulation to the engine 3, and thus there is the possibility that when the engine 3 is continuously operated, the fuel temperature of the fuel being supplied to the engine 3 may gradually rise and reach an excessively high level. In view whereof, because in the fuel supply route 4 the cooling unit 8 is arranged further downstream than the merge and discharge unit 7 in the fuel supply direction, the fuel that is discharged from the merge and discharge unit 7 to the downstream site 4b of the fuel supply route 4 can be cooled to a desired temperature range by the cooling unit 8, thus preventing the fuel temperature of the fuel being supplied to the engine 3 from reaching an excessively high level.

Figure 4:
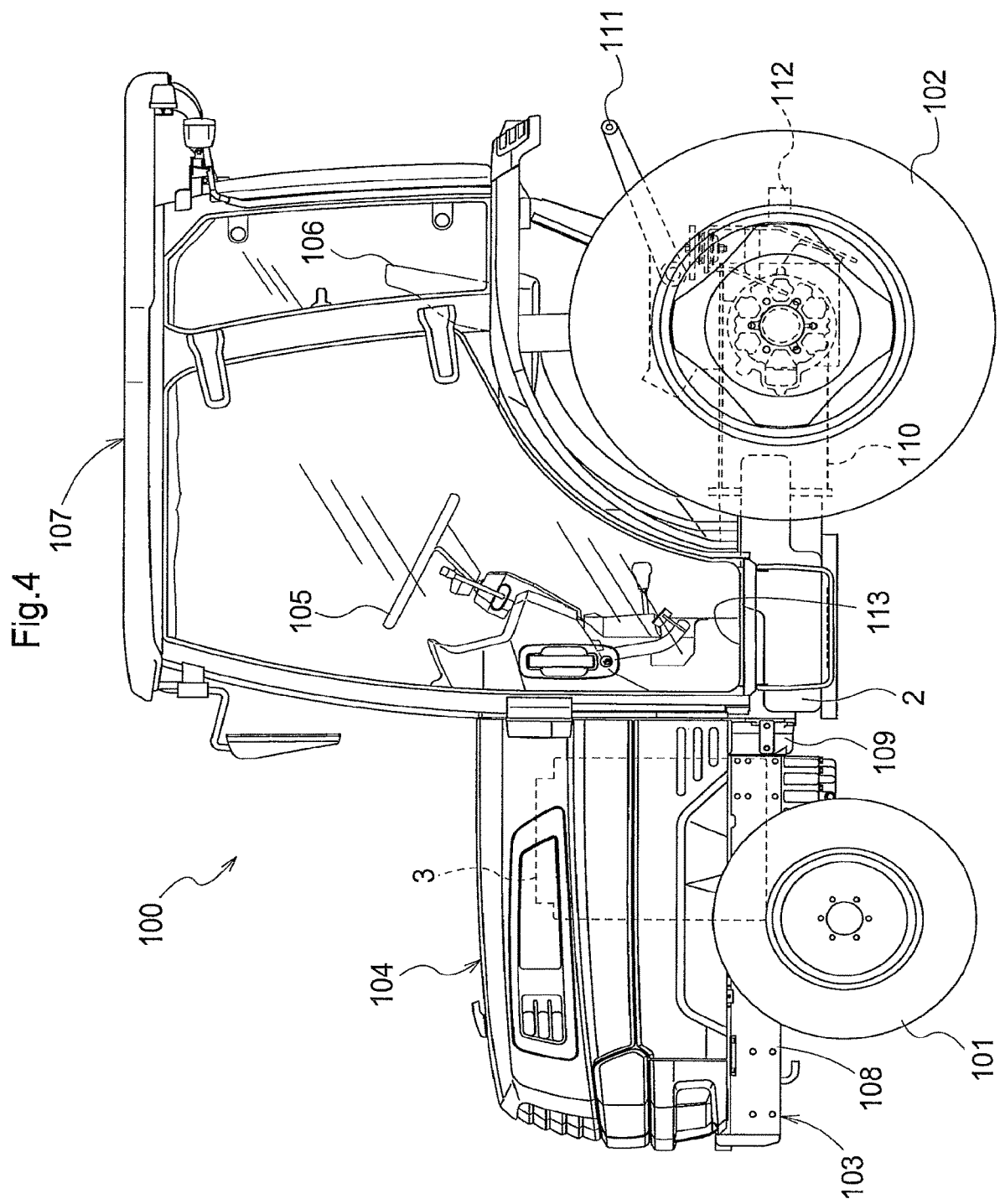
FIG. 4 is a side view of a tractor.

The fuel supply device 1 of the engine in the present embodiment is adapted for a work vehicle such as a tractor 100, as is illustrated in FIG. 4. The tractor 100 is of a four-wheel drive format, provided with a traveling vehicle body 103 having a pair of left and right front wheels 101 that can be driven and operated by steering and a pair of left and right rear wheels 102 that can be driven. A hood 104 in which the engine 3 and the like are housed is provided to the front of the traveling vehicle body 103, and a cabin 107 on which a steering handle 105, seat 106, and the like are housed is provided to the rear of the traveling vehicle body 103.

A main frame 108 extends forward from a lower part of the engine 3, and an axle case (not shown) onto which the front wheels 101 are mounted and the like are supported at the main frame 108. A clutch housing 109 extends rearward from the engine 3, and a transmission case 110 located below the seat 106 is coupled to the clutch housing 109, the configuration being such that the power from the engine 3 is transmitted to the rear wheels 102.

Provided to the rear of the traveling vehicle body 103 are a link mechanism 111, constituted of a pair of left and right lift arms, and a power take-off shaft 112. Such is the configuration that coupling a rotary tilling device (not shown) or the like to the link mechanism 111 so as to be vertically operable and interlockingly coupling the rotary tilling device or the like to the power take-off shaft 112 makes it possible to vertically operate and drive the rotary tilling device or the like.

Figure 5:
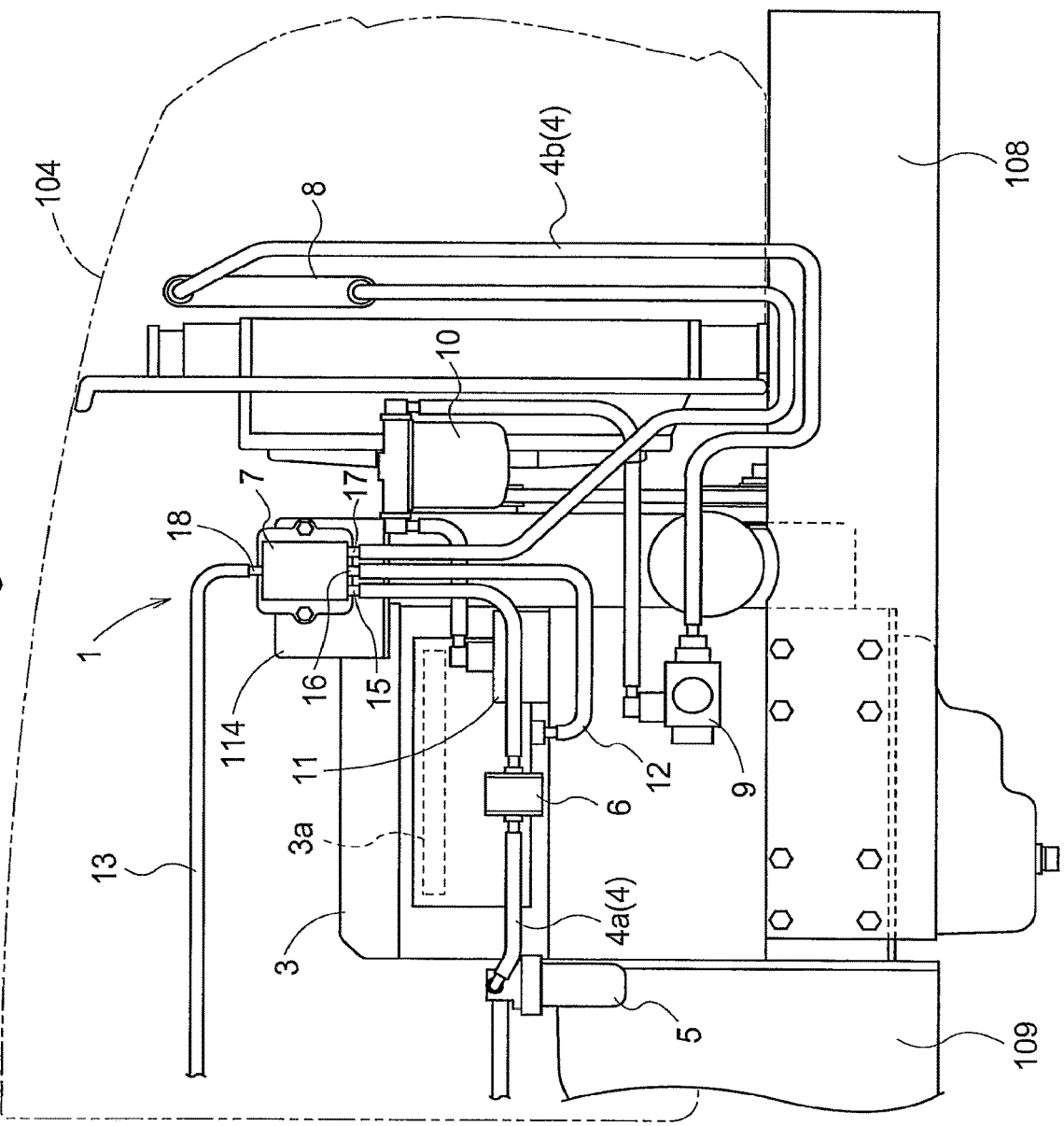
FIG. 5 is a schematic view illustrating an arrangement position of a merge and discharge unit in a tractor.

In the fuel supply device 1, as illustrated in FIG. 5, housed within the hood 104 are the moisture removal unit 5, the electromagnetic pump 6, the merge and discharge unit 7, the cooling unit 8, the feed pump 9, the filter 10, and the supply pump 11.

FIG. 5 is a side view in which the interior of the hood 104 is viewed from the right side; the moisture removal unit 5, the electromagnetic pump 6, the merge and discharge unit 7, the feed pump 9, the filter 10, and the supply pump 11 are arranged on the right side of the engine 3.

As illustrated in FIG. 4, the fuel tank 2 is arranged below a floor panel 113 that forms the floor of the cabin 107. Although not shown in the drawings, the fuel tank 2 is provided as a left/right pair, with a first fuel tank arranged on the right side of the cabin 107 and a second fuel tank arranged on the left side thereof. A fuel replenishment port is provided to the first fuel tank, the configuration being such that fuel is supplied from the first fuel tank to the second fuel tank by way of an interconnecting path. Intake of the fuel from the fuel tank 2 involves taking in fuel from the second fuel tank and supplying the taken-in fuel to the engine 3 by the fuel supply route 4.

As illustrated in FIG. 5, the merge and discharge unit 7 is fixed to the support member 114 by the bolt being inserted and fastened to the hole part 19 for attachment, and the position for arranging same is a position high up on the right side than the engine 3. This makes it possible for the position for arranging the merge and discharge unit 7 to be a high position, thus making it possible, even when air is included in the fuel collected in the reservoir unit 14, for the air to rise and be discharged from the second discharge unit 18, allowing for proper removal of air in the merge and discharge unit 7. In regard thereto, the height at which the merge and discharge unit 7 is arranged is a position that is higher than those of the moisture removal unit 5, the electromagnetic pump 6, the feed pump 9, the filter 10, the supply pump 11, and the like.

Other Embodiments (1) In the foregoing embodiment, for example, arranging the fuel tank 2 farther up than the moisture removal unit 5, the cooling unit 8, or the like makes it possible to forgo the electromagnetic pump 6 (which is equivalent to a second fuel pump). Also, beyond the electromagnetic pump 6, it would furthermore be possible to forgo the cooling unit 8 or the feed pump 9; of these three devices, any one or two can be forgone, or all.

(2) In the foregoing embodiment, it would also be possible for the position where the merge and discharge unit 7 is arranged in the fuel supply route 4 to be located between the moisture removal unit 5 and the electromagnetic pump 6.

(3) In the foregoing embodiment, causing the flow path cross-sectional area of the second fuel return route 13 to be smaller than that of the downstream site 4b in fuel supply route 4 makes it possible to provide to the second fuel return route 13 a constricted site of lesser flow path cross-sectional area than that of the downstream site 4b in the fuel supply route 4. Providing the constricted part of such description also makes such a configuration possible that the amount of fuel discharged from the second discharge unit 18 is less than the amount of fuel discharged from the first discharge unit 17.

Also, as regards the constricted site, there is no restriction to being one where the flow path cross-sectional area is adjusted; providing a constriction such as an orifice would also make it possible to provide a constricted site.

(4) In the foregoing embodiment, the full amount of surplus fuel of the engine 3 was returned to the merge and discharge unit 7 by the first fuel return route 12, but it would also be possible to provide, for example, a connecting flow path for fuel return that connects together the fuel tank 2 and a midway site of the first fuel return route 12, so that a portion of the surplus fuel of the engine 3 is returned to the merge and discharge unit 7 by the first fuel return route 12 and a portion of the remaining surplus fuel of the engine 3 is returned directly to the fuel tank 2 by the connecting flow path for fuel return.

(5) The foregoing embodiment illustrates an example where the fuel supply device for an engine as in the present invention is adapted to the tractor 100 for agricultural use, but adaptation to a variety of other work vehicles would also be possible.

Second Embodiment

An example where an intake structure for a fuel tank as in the present invention has been adapted to a tractor shall now be described, on the basis of the accompanying drawings.

Figure 6:
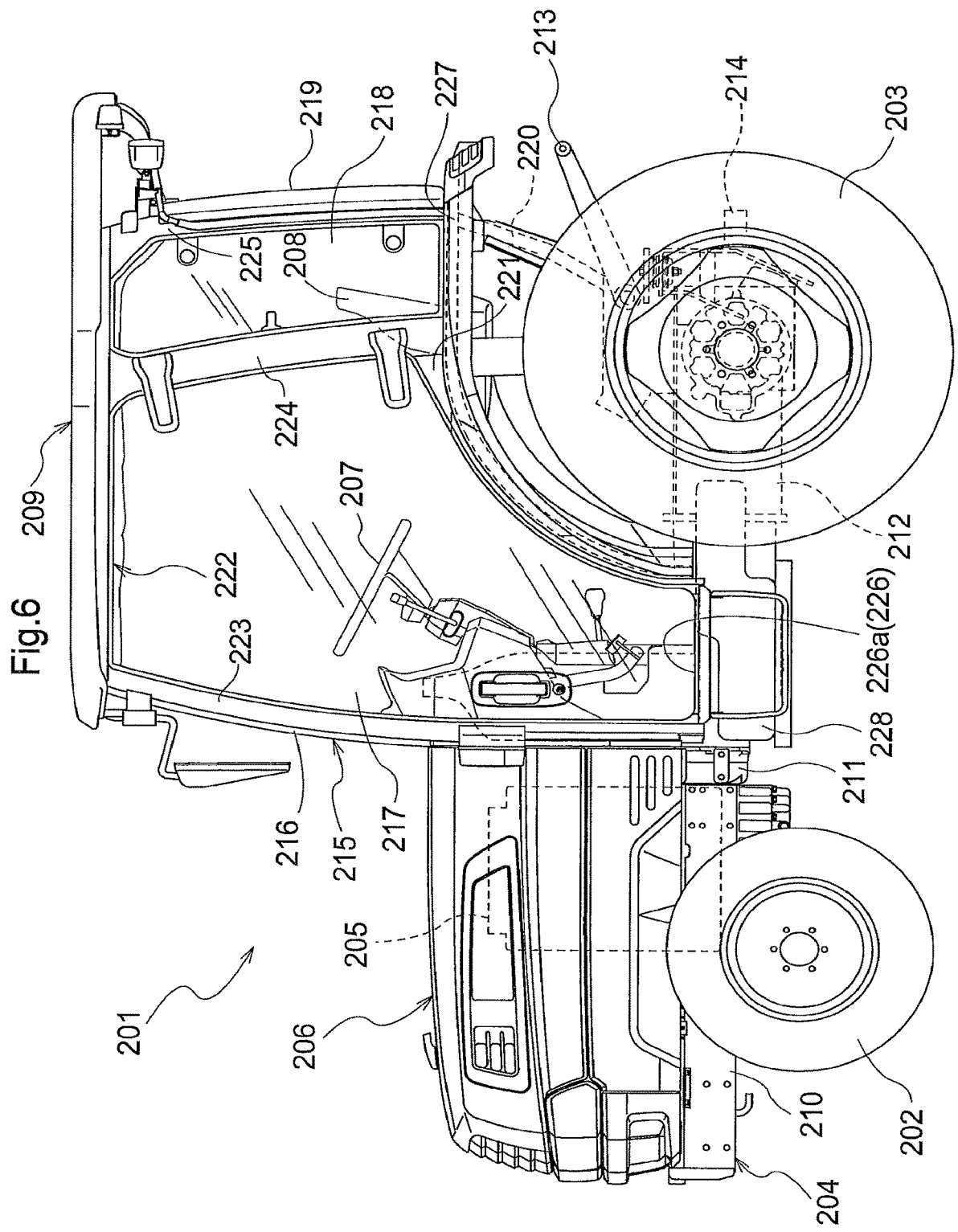
FIG. 6 is a side view of a tractor.

This tractor 201, as illustrated in FIG. 6, is constituted of a four-wheel drive format, provided with a traveling vehicle body 204 having a pair of left and right front wheels 202 that can be driven and operated by steering and a pair of left and right rear wheels 203 that can be driven. A hood 206 in which an engine 205 and the like are housed is provided to the front of the traveling vehicle body 204, and a cabin 209 on which a steering handle 207, a seat 208, and the like are housed is provided to the rear of the traveling vehicle body 204.

A main frame 210 extends forward from a lower part of the engine 205, and an axle case (not shown) onto which the front wheels 202 are mounted and the like are supported at the main frame 210. A clutch housing 211 extends rearward from the engine 205, and a transmission case 212 located below the seat 208 is coupled to the clutch housing 211, the configuration being such that the power from the engine 205 is transmitted to the rear wheels 203.

Provided to the rear of the traveling vehicle body 204 are a link mechanism 213, constituted of a pair of left and right lift arms, and a power take-off shaft 214. Such is the configuration that coupling a rotary tilling device (not shown) or the like to the link mechanism 213 so as to be vertically operable and interlockingly coupling the rotary tilling device or the like to the power take-off shaft 214 makes it possible to vertically operate and drive the rotary tillage device or the like.

Housed within the transmission case 212 are, for example, a gear-type transmission device and a stepless transmission device such as a hydrostatic stepless transmission device, though a depiction thereof has been forgone; power taken out from the engine 205 is transmitted to the stepless transmission device via a main clutch (not shown) or the like. Of the power that is taken out from the stepless transmission device, power for traveling is transmitted to the left and right front wheels 202 and to the left and right rear wheels 203 via the gear-type transmission device. Of the power that is taken out from the stepless transmission device, also, power for working is transmitted to the power take-off shaft 214 via an action clutch (not shown) or the like.

Figure 7:
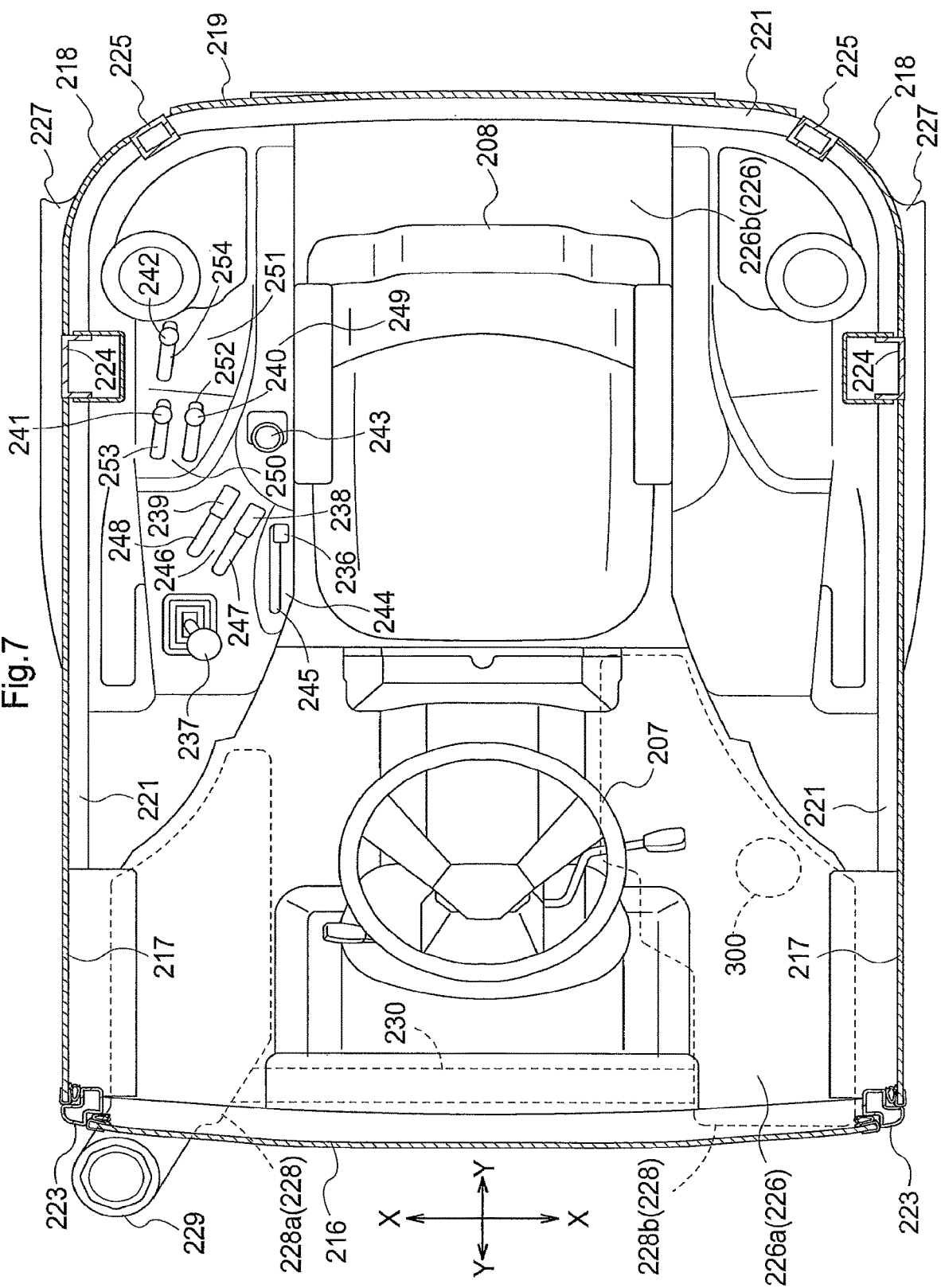
FIG. 7 is a plan view illustrating the inside of a cabin.

The cabin 209, as illustrated in FIGS. 6 and 7, is configured to be provided with: a cabin frame 215; a front windshield 216 for covering the front surface of the cabin frame 215; a door 217 provided to an entry on two sides of the cabin frame 215; a side windshield 218 provided to the rear of the door 217; and a rear windshield 219 for covering the rear surface of the cabin frame 215.

The cabin frame 215 is provided with: a support frame 22, in the shape of a square pipe, for supporting the cabin 209; a lower frame 221 coupled to the support frame 220; and an upper frame 222. Between the lower frame 221 and the upper frame 222, a pair of left and right A-posts 223 are provided to the front end thereof, a pair of left and right B-posts 224 are provided to the middle thereof, and a pair of left and right C-posts 225 are provided to the rear end thereof. The A-posts 223, the B-posts 224, and the C-posts 225 are each coupled by the upper end to the upper frame 222 and by the lower end to the lower frame 221.

The lower side of the cabin frame 215 is equipped with a floor panel 226 that forms the floor of the cabin 209, and a rear wheel fender 227 formed in a shape that covers the outer periphery of the rear wheels 203 from above is fixed to both left and right sides of the floor panel 226. The floor panel 226 is configured to be provided with a step floor panel 226a for the front of the cabin 209 and a seat floor panel 226b for the rear of the cabin 209, the seat 208 being disposed at the left/right middle of the seat floor panel 226b.

The steering handle 207, as illustrated in FIG. 7, is supported at the front of the cabin 209. The front windshield 216 is mounted across the left and right A-posts 223, and the front surface of the cabin frame 215 is covered by the front windshield 216. The rear windshield 219 is mounted across the left and right C-posts 225, and the rear surface of the cabin frame 215 is covered by the rear windshield 219. The doors 217 are mounted onto the entries on both sides of the cabin frame 215 formed across the A-posts 223 and the B-posts 224, so that the doors can be slid open about an axis of the rear end; the side windshields 218 are mounted across the B-posts 224 and the C-posts 225 so that the side windshields can be slid open.

Figure 8:
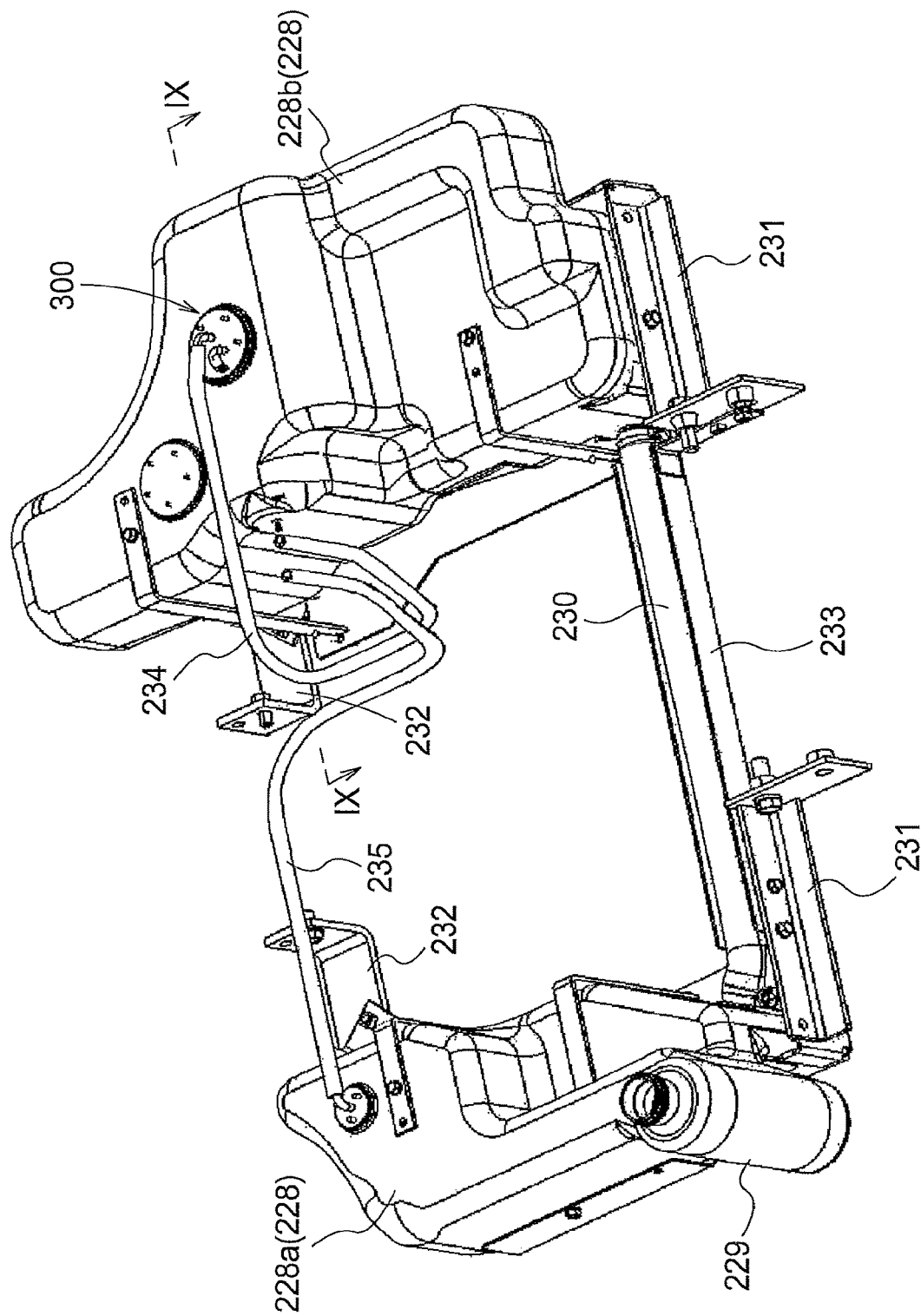
FIG. 8 is a perspective view of a fuel tank.

Fuel tanks 228 for collecting fuel to be supplied to the engine 205, as illustrated in FIGS. 6 and 7, are arranged below the step floor panel 226a in the floor panel 26 that forms the floor of the cabin 209. The fuel tanks 228, as illustrated in FIG. 8, are provided as a left/right pair, with a first fuel tank 228a arranged on the right side of the cabin 209 and a second fuel tank 228b arranged on the left side thereof. The first fuel tank 228a and the second fuel tank 228b are each supported by the traveling vehicle body 204 via a frontal support bracket 231 provided to a frontal site thereof and via a rear support bracket 232 provided to a rear site thereof.

A fuel replenishment unit 229 is provided to the first fuel tank 228a, and a communicating part that interconnects the first fuel tank 228a and the second fuel tank 228b is provided. Fuel being replenished from the fuel replenishment unit 229 is thereby supplied to the first fuel tank 228a, passed through the communicating part 230 from the first fuel tank 228a, and supplied also to the second fuel tank 228b. The communicating part 230 is provided with a check valve (not shown) that allows fuel to flow through from the first fuel tank 228a to the second fuel tank 228b and checks against flow of fuel through from the second fuel tank 228b to the first fuel tank 228a. The communicating part 230 is covered by a cover body 233, of concave cross-section, that covers the front side thereof, the rear side thereof, and the bottom side thereof.

The first fuel tank 228a and the second fuel tank 228b are constituted of a resin that has been molded by blow molding. The first fuel tank 228a and the second fuel tank 228b are provided with a stepped part so as to be of different height at the upper end thereof, and are formed in a shape that is longer in the front/rear direction when seen in plan view. The first fuel tank 228a and the second fuel tank 228b, as illustrated in FIGS. 7 and 8, are formed in a curved shape so that an outside site of the rear end site thereof runs along the shape of the front end site of the rear wheel fender 227, as seen in plan view, and the rear end site thereof is configured so as to extend further rearward than the front end of the rear wheel fender 227. The first fuel tank 228a and the second fuel tank 228b are thus adapted to be capable of ensure a greater capacity while also making effective use of the space below the step floor panel 226a.

In the present embodiment, an intake structure 300 for a fuel tank is provided to the second fuel tank 228b, the configuration being such that fuel that has been taken in by the intake structure 300 is supplied to the engine 205 by way of a fuel supply route 234. A fuel return route 235 for returning to the fuel tanks 228 fuel from the engine 205 is connected to the first fuel tank 228a.

Figure 9:
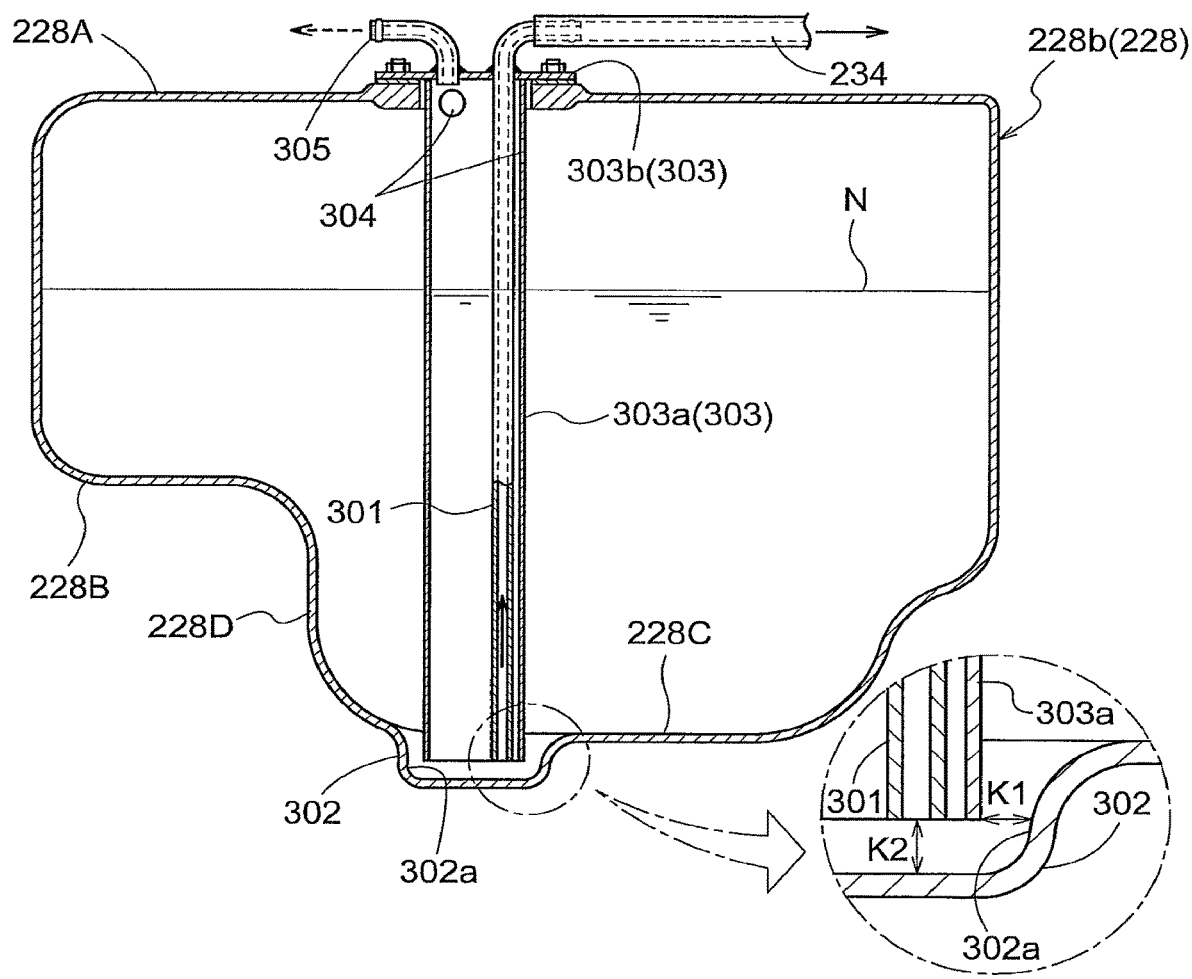
FIG. 9 is a cross-sectional view of a fuel tank.

The following describes the intake structure 300. The intake structure 300, as illustrated in FIG. 9, is provided with: an intake unit 301 for taking in and drawing out fuel N of the second fuel tank 228b, above the bottom of the second fuel tank 228b; a recessed reservoir unit 302 that is arranged at the bottom of the second fuel tank 228b, is recessed so as to be lower than same, and is able to collect the fuel N; and a covering 303 for covering the recessed reservoir unit 302 in a state where the fuel N is permitted to flow into the recessed reservoir unit 302. The intake unit 301 is adapted to take in and draw out the fuel N that has been collected in the recessed reservoir unit 302.

Figure 10:
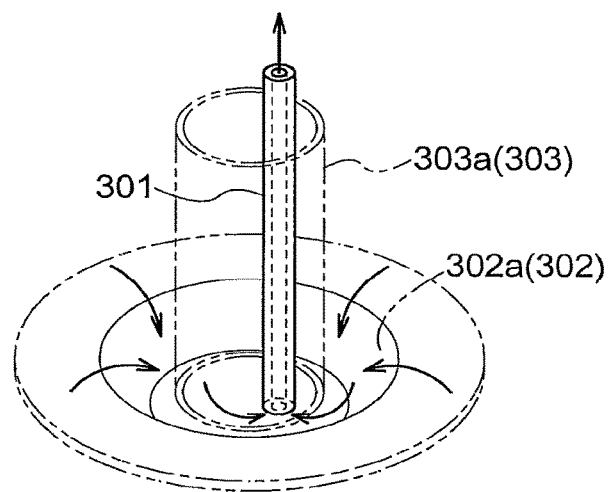
FIG. 10 is a perspective view illustrating the main parts of a fuel tank.

FIG. 9 is a cross-sectional view in which the second fuel tank 228b is seen from the rear in FIG. 10; as illustrated in FIG. 9, the second fuel tank 228b is formed in a shape where an upper site 228A of the outside thereof is projected outward, and the bottom thereof is formed so as to be stepped, having a stepped part 228D between an outer bottom 228B and an inner bottom 228C.

The recessed reservoir unit 302 is provided to the inner bottom 228C, which is located bottommost on the bottom of the second fuel tank 228b. The recessed reservoir unit 302 is arranged at a position close to the stepped part 228D on the inner bottom 228C, and is arranged at a position where the fuel N readily flows in at the curved stepped part 228D. The recessed reservoir unit 302, as illustrated in FIG. 10, is formed in a circular shape when seen in plan view, and an inner wall part 302a thereof is formed in an inclined shape, where a lower site is located further inward than is an upper site.

The covering 303, as illustrated in FIGS. 9 and 10, is constituted of a circular cylindrical body 303a having a hollow space that has communication with the recessed reservoir unit 302, and the lower end of the cylindrical body 303a is formed so as to be smaller than the recessed reservoir unit 302 when seen in plan view and is inserted into the interior of the recessed reservoir unit 302. Because the recessed reservoir unit 302 and the covering 303 are both formed so as to be circular, the outer diameter of the covering 303 is configured so as to be smaller than the inner diameter of the recessed reservoir unit 302. The covering 303 is arranged at a middle site of the recessed reservoir unit 302 when seen in plan view, the configuration being such that the middle site of the recessed reservoir unit 302 is covered by the covering 303.

This manner of arranging the covering 303 makes it possible to form a spacing K1 between an outer wall part of the covering 303 and the inner wall part 302a of the recessed reservoir unit 302, across the full length of the outer periphery of the covering 303. Accordingly, covering the middle site of the recessed reservoir unit 302, as seen in plan view, with the covering 303, while also allowing the fuel N to flow into the recessed reservoir unit 302 from the spacing K1, prevents the fuel N from flowing outwardly from the recessed reservoir unit 302.

The covering 303 is configured to be provided with the circular cylindrical body 303a, the interior of which is a hollow space, and is arranged so that the lower end of the cylindrical body 303a extends out to the interior of the recessed reservoir unit 302. Thus, even when the traveling vehicle body 204 is swung in the front/rear direction and the left/rear direction, the presence of the cylindrical body 303a prevents the liquid level of the fuel N that has been collected in the recessed reservoir unit 302 from swinging. Moreover, as illustrated in FIG. 9, the fuel N can be collected in the hollow space of the interior of the cylindrical body 303a, as well, and a correspondingly greater capacity of fuel taken in by the intake unit 301 can be ensured. It is thus possible for the fuel N having been collected in the recessed reservoir unit 302 to flow out therefrom, while a greater capacity of fuel N taken in by the intake unit 301 can also be ensured; an event where no fuel N remains in the lower end of the intake unit 301 and where air is taken in at the intake unit 301 can be properly prevented.

The intake unit 301 is constituted of a tubular body supported by the covering 303, and is disposed extending upward and downward through the interior space of the hollow of the covering 303. The lower end of the intake unit 301 is given substantially the same height as the lower end of the covering 303, and is inserted into the interior of the recessed reservoir unit 302. The intake unit 301 is arranged at a position shifted further toward the outer periphery than the middle, as seen in plan view, in the circular cylindrical body 303a in the covering 303.

Herein, for example, the lower ends of the intake unit 301 and of the covering 303 are arranged at a vertically intermediate part of the recessed reservoir unit 302. The spacing K1 between the outer wall part of the covering 303 and the inner wall part 302a of the recessed reservoir unit 302 is configured so as to be smaller than a spacing K2 that is between the bottom of the recessed reservoir unit 302 and the lower ends of the intake unit 301 and of the covering 303.

This makes it possible to properly prevent the collected fuel N from flowing outwardly therefrom, while also making it possible to collect even more of the fuel N.

The covering 303, as has been described above, is constituted of the circular cylindrical body 303a, but is provided with a cover body 303b for closing off an upper part of the cylindrical body 303a. The cover body 303b is configured to be of a disc shape of greater diameter than that of the cylindrical body 303a, and a site projecting further outward than the cylindrical body 303a serves as an attachment site for the second fuel tank 228b. A circular opening part permitting insertion and removal of the cylindrical body 303a is formed at the upper surface of the second fuel tank 22b, the configuration being such that the covering 303 is mounted onto the second fuel tank 228b by inserting and fastening a bolt to a hole part of the attachment site of the cover body 303b in a state where the cylindrical body 303a has been inserted into the opening part. The intake unit 301 is supported by the covering 303 in a state of penetrating through the cover body 303b, and is adapted to enable insertion and removal of the cover body 303 supporting the intake unit 301, into/from the second fuel tank 228b.

Provided to an upper site of the cylindrical body 303a are a plurality of communicating holes 304 creating communication between a hollow space of the interior thereof and the exterior thereof. The plurality of communicating holes 304 are arranged dispersed in the peripheral direction and up/down direction of the cylindrical body 303a. This gives such a configuration that even when air is included in the fuel N that is collected in the recessed reservoir unit 302, the air rises through the hollow space of the cylindrical body 303a and is discharged to the exterior of the cylindrical body 303a at the communicating holes 304. Also provided to the cover body 303b is an exterior communicating part 305 that penetrates therethrough an creates communication between the hollow space of the interior of the cylindrical body 303a and the exterior of the second fuel tank 228b. The exterior communicating part 305 is adapted to discharge to the exterior of the second fuel tank 228b air that has risen through the hollow space. The communicating holes 304 and the exterior communicating part 305 are thus provided to the upper site of the cylindrical body 303a, as an air discharge unit capable of discharging the air of the hollow space to the exterior of the cylindrical body 303a. Thus, even when air is included in the fuel N having been collected in the recessed reservoir unit 302, it is possible to properly remove the air, and more reliably prevent the air from being taken in at the intake unit 301.

Coupling of a front loader to the front of the traveling vehicle body 204, though a depiction thereof has been omitted, enables the tractor 201 configured in this manner to, for example, carry out work such excavating earth and sand or transporting and transferring the earth and sand to a desired location such as a track, and the like. In addition to a rotary tilling device that can be interlockingly coupled to the power take-off shaft 214, the configuration also permits mounting of a variety of other work devices, depending on the work, to the rear of the traveling vehicle body 204. Also, though a depiction has been omitted, a plurality (for example, three) of auxiliary control valves are provided to the rear of the traveling vehicle body 204, in the vicinity of a hydraulic device of the link mechanism 213 or the like, and therefore in cases where a variety of work devices are mounted the configuration makes it possible to couple hydraulic control machinery for the work device to the auxiliary control valves and hydraulically control the work device.

The tractor 201 is thus adapted to be capable of carrying out a variety of tasks, by coupling the front loader to the front of the traveling vehicle body 204 or by coupling a variety of work devices to the rear of the traveling vehicle body 204. Also provided inside the cabin 209 are a variety of operation levers, such as an operation lever for causing the traveling vehicle body 204 to travel, as well as an operation lever for manually operating the front loader and an operation lever for manually operating the work devices.

A variety of operation levers disposed inside the cabin 209 shall now be described.

Figure 11:
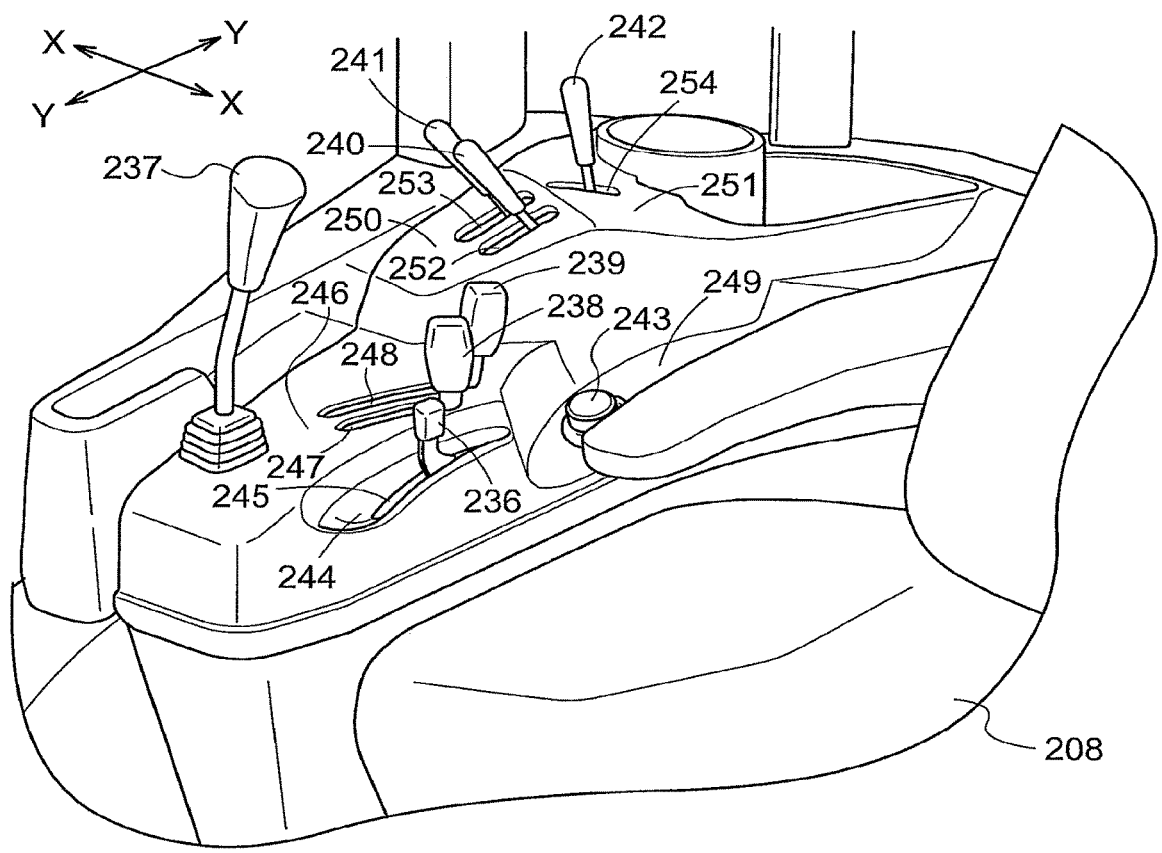
FIG. 11 is a perspective view illustrating the arrangement of a variety of operation levers in a cabin.

As illustrated in FIGS. 7 and 11, a variety of operation levers are disposed in concentration above the rear wheel fender 227 on the right side of the seat 208. FIG. 11 is a perspective view illustrating the right side of the seat 208 of the cabin 209. Provided as operation levers are: a hand accelerator lever 236 for manually operating the accelerator; a loader lever 237 for the front loader; a draft lever 238 for setting a work load in a draft control for maintaining a constant work load; a position lever 239 for carrying out positional control vertically moving the link mechanism 213; and auxiliary control levers 240, 241, 242 for operating the auxiliary control valves. As regards the auxiliary control levers, three auxiliary control valves are provided to the rear of the traveling vehicle body 204, as is described above, and thus there are three operating levers provided, namely, a first auxiliary control lever 240, a second auxiliary control lever 241, and a third auxiliary control lever 242.

Also, in addition to the variety of operation levers 236 to 242, a power take-off switch 243 for switching the power take-off shaft 214 between a drive state and a non-drive state is also disposed on the right side of the seat 208.

The following describes the arrangement positions, configurations, and the like of the variety of operation levers 236 to 242. The "left/right direction" is understood to be the left/right direction of the traveling vehicle body 204 (the X direction in FIGS. 7 and 11), and the "front/rear direction" is understood to be the front/rear direction of the traveling vehicle body 204 (the Y direction in FIGS. 7 and 11).

Among the variety of operation levers, the hand accelerator lever 236 is arranged at a position closest to the seat 208 in the left/right direction (the X direction). A first installation surface 244 for installing the hand accelerator lever 236 is formed atop the rear wheel fender 227. The first installation surface 244 is formed in an inclined shape that extends in the front/rear direction (the Y direction) and becomes increasingly lower going forward. The hand accelerator lever 236 is provided so as to be able to swing forward and back along a first guide 245 extending in the front/rear direction (the Y direction), formed on the first installation surface 244.

The loader lever 237 is arranged further forward than the hand accelerator lever 236, on the side further apart 25 from the seat 208 than the hand accelerator lever 236 in the left/right direction (the X direction). The loader lever 237 is configured in a vertically oriented cross-shape permitting swinging in the front/rear direction (the Y direction) and the left/right direction (the X direction). The loader lever 237 is arranged so that a rearward region of the swing range in the front/rear direction (the Y direction) thereof is lined up in the left/right direction (the X direction) with a forward region of the swing range in the front/rear direction (the Y direction) of the hand accelerator lever 236.

The draft lever 238 and the position lever 239 are both arranged, in a state where the two levers are lined up together—in the left/right direction (the X direction), further rearward than the loader lever 237, on a side further apart from the seat 208 than the hand accelerator lever 236 in the left/right direction (the X direction). A second installation surface 246 for installing the draft lever 238 and the position lever 239 is formed atop the rear wheel fender 227, and the second installation surface 246 is adapted so as to be one step higher than the first installation surface 244. A second guide 247 and a third guide 248 that are further inclined at the front side toward the side that is apart from the seat 208 in the left/right direction (the X direction) are formed on the second installation surface 246, and the draft lever 238 and the position lever 239 are provided so as to be able to swing along the second guide 247 and the third guide 248.

The power take-off switch 243 is arranged on the rear side of the hand accelerator lever 236. A third installation surface 249 for installing the power take-off switch 243 is formed. The third installation surface 249 is formed in a curved shape that is lower than the first installation surface 244 and extends in the front/rear direction, and the power take-off switch 243 is provided to the third installation surface 249 and adapted to be press-operable.

The auxiliary control levers 240 to 242 are arranged further rearward than the draft lever 238 and the position lever 239, on a side that is further apart from the seat 208 than the draft lever 238, the position lever 239, and the power take-off switch 243 in the left/right direction (the X direction). A fourth installation surface 250 for installing the first auxiliary control lever 240 and the second auxiliary control lever 241 is formed, and a fifth installation surface 251 for installing the third auxiliary control lever 242 is formed. The fourth installation surface 250 is provided with a stepped part relative to the rear end of the second installation surface 246, and is formed at a higher position than that of the second installation surface 246 in an inclined shape that becomes lower going forward. A fourth guide 252 and a fifth guide 253 extending in the front/rear direction (the Y direction) are formed on the fourth installation surface 250 in a state of being lined up together in the left/right direction (the X direction), and the first auxiliary control lever 240 and the second auxiliary control lever 241 are provided so as to be able to slide along the fourth guide 252 and the fifth guide 253. The fifth installation surface 251 is a rearward continuation from the fourth installation surface 250, and is formed in an inclined shape that becomes lower going rearward. A sixth guide 254 that extends in the front/rear direction (Y direction) is formed on the fifth installation surface 251, and the third auxiliary control lever 242 is provided so as to be able to slide along the sixth guide 254.

As regards the arrangement relationship of the three operation levers, i.e., the first through third auxiliary control levers 240 to 242, the first auxiliary control lever 240 and the second auxiliary control lever 241 are lined up together in the left/right direction (the X direction), and the third auxiliary control lever 242 is arranged further rearward than the first auxiliary control lever 240 and the second auxiliary control lever 241 on a side that is further apart from the seat 208 than the first auxiliary control lever 240 and the second auxiliary control lever 241 in the left/right direction (the X direction). In other words, the arrangement positions of the three operation levers, i.e., the first through third auxiliary control levers 240 to 242, are arranged so as to be in an L-shape when seen in plan view.

This manner of arranging the first through third auxiliary control levers 240 to 242 prevents the third auxiliary control lever 242 from becoming a hindrance when the driver operates the first auxiliary control lever 240 or the second auxiliary control lever 241, and conversely also prevents the first auxiliary control lever 240 or the second auxiliary control lever 241 from becoming a hindrance when the driver operates the third auxiliary control lever 242. Also, for example, there is no need to ensure adequate installation space for lining up the three operation levers together in the left/right direction (the X direction), and this is beneficial in terms of installation space. Moreover, because a comparatively greater left/right (X-direction) spacing is taken between the first auxiliary control lever 240 and the second auxiliary control lever 241, the second auxiliary control lever 241 is less likely to become a hindrance when the driver operates the first auxiliary control lever 240 and the first auxiliary control lever 240 is less likely to become a hindrance when the driver operates the second auxiliary control lever 241. Accordingly, the operability of the auxiliary control levers 240 to 242 can be enhanced.

Figure 12:
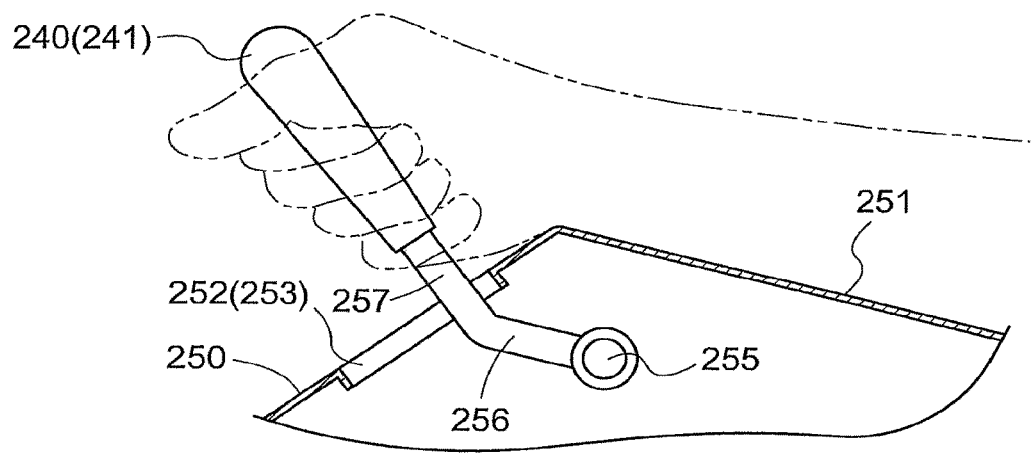
FIG. 12 is a cross-sectional view illustrating the main parts of an auxiliary control lever.

The first and second auxiliary control levers 240, 241 are pivotally supported at proximal ends thereof, as illustrated in FIG. 12, and are provided with a proximal end side 256 extending from a pivot support 255 therefor and a distal end site 257 curved upward from the proximal end site 256. The first and second auxiliary control levers 240, 241 are thereby adapted to have a large swing range in not only the front/rear direction but also in the up/down direction. The fifth installation surface 251, which is formed in an inclined shape that becomes lower going rearward, is present at the rear side of the first and second auxiliary control levers 240, 241. Therefore, the driver is readily able to vertically swing the first and second auxiliary control levers 240, 241 in a state where the wrist or the like is placed atop the fifth installation surface 251. The operability of the first and second auxiliary control levers 240, 241 can accordingly be even further enhanced.

Figure 13:
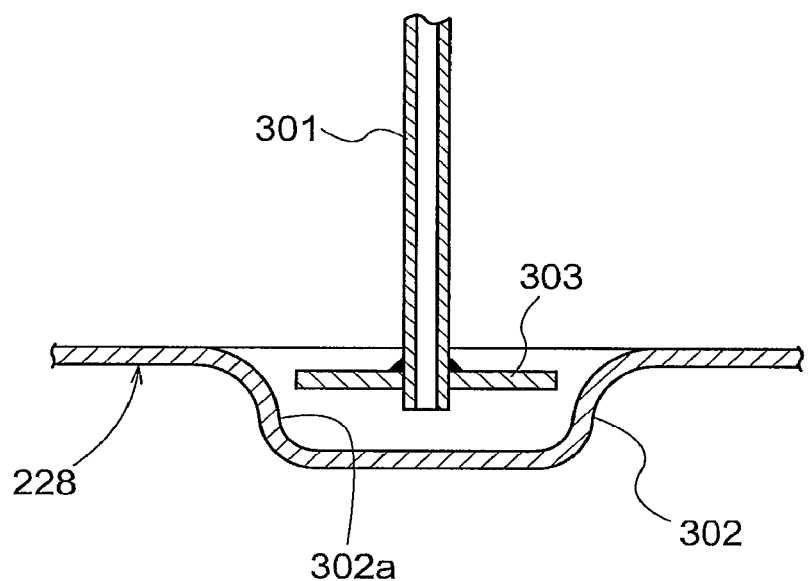
FIG. 13 is a suction structure of a fuel tank in a separate embodiment.
Figure 14:
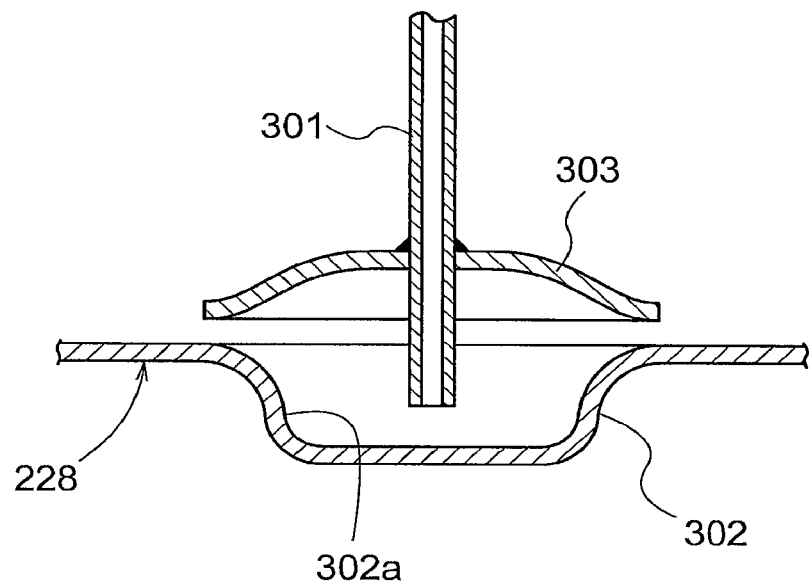
FIG. 14 is a suction structure of a fuel tank in a separate embodiment.

Other Embodiments (1) In the foregoing embodiment, the covering 303 was constituted of the cylindrical body 303a, but, for example, as illustrated in FIGS. 13 and 14, the covering 303 could also be constituted of a planar body. In such a case, as illustrated in FIGS. 13 and 14, supporting the covering 303 on the intake unit 301 makes it possible to arrange the covering 303 at a desired location.

In FIG. 13, the planar body that is the covering 303 is formed in a circular shape of lesser diameter than that of the circular recessed reservoir unit 302, and is arranged so that a middle site of the recessed reservoir unit 302 as seen in plan view is covered with the covering 303. Also, in FIG. 13, the covering 303 is inserted into the interior of the recessed reservoir unit 302.

In FIG. 14, the planar body that is the covering 303 is formed in a circular shape of greater diameter than that of the circular recessed reservoir unit 302, and is arranged so that the entirety of the recessed reservoir unit 302 as seen in plan view is covered with the covering 303. Also, in FIG. 14, the covering 303, spaced apart from the bottom of the fuel tanks, is arranged thereabove.

(2) In the foregoing embodiment, the fuel tank 228 is constituted of the first fuel tank 228a and the second fuel tank 228b, but, for example, a single fuel tank would also be possible, and the number thereof can be altered as appropriate. Also, as regards the arrangement positions of the fuel tanks 228, there is no limitation to being below the step floor panel 226a; for example, arrangement in the interior of the hood 206 would also be possible, and the arrangement positions thereof can be altered as appropriate.

(3) In the foregoing embodiment, the arrangement position of the covering 303 can be altered as appropriate. As stated in (1) above, as illustrated in FIG. 14, the entirety of the recessed reservoir unit 302 as seen in plan view may be covered; in a case where a portion of the 10 recessed reservoir unit 302 as seen in plan view is covered, there is no limitation to the middle site being covered. Neither is the lower end of the covering 103 limited to being inserted into the interior of the recessed reservoir unit 302; the lower end of the covering 103 can be arranged, 15 e.g., so as to become substantially flush with the bottom of the fuel tanks.

(4) In the foregoing embodiment, an example where the intake structure for a fuel tank as in the present invention 20 is adapted to the tractor 201 is illustrated, but the intake structure may be adapted to a variety of other work vehicles is also possible.

The invention claimed is:

1. A device for supplying fuel to an engine, the fuel supply device comprising:
   a fuel tank;
   a fuel supply route for supplying to the engine fuel that has been collected in the tank;
   a filter provided to the fuel supply route;
   a first fuel pump provided downstream of the filter in a fuel supply direction on the fuel supply route;
   a merge and discharge unit for merging and discharging fuel, the merge and discharge unit being provided to a site between the fuel tank and the filter on the fuel supply route;
   a first fuel return route for returning the fuel of the engine to the merge and discharge unit; and
   a second fuel return route for returning to the fuel tank the fuel discharged from the merge and discharge unit;
   wherein:
   the merge and discharge unit has: a reservoir unit in which fuel can be collected; a first merge unit for merging into the reservoir unit the fuel from a site upstream of the merge and discharge unit on the fuel supply route; a second merge unit for merging into the reservoir unit the fuel from the first fuel return route; a first discharge unit for discharging a portion of the fuel in the reservoir unit to a site downstream of the merge and discharge unit on the fuel supply route; and a second discharge unit for discharging a remaining portion of the fuel in the reservoir unit into the second fuel return route, and
   the first merge unit, the second merge unit, and the first discharge unit of the merge and discharge unit are arranged in sites below the reservoir unit, and the second discharge unit is arranged at a site above the reservoir unit.

2. The device for supplying fuel to an engine as in claim 1, wherein:
   the amount of fuel discharged from the second discharge unit is less than the amount of fuel discharged from the first discharge unit.

3. The device for supplying fuel to an engine as in claim 2, wherein:
   in causing the amount of fuel discharged from the second discharge unit to be less than the amount of fuel discharged from the first discharge unit, a constricted site where the flow path cross-sectional area is less than that of the first discharge unit is provided to the second discharge unit, or a constricted site where the flow path cross-sectional area is less than that of the downstream site on the fuel supply route is provided to the second fuel return route.

4. The device for supplying fuel to an engine as in claim 1, wherein:
   a moisture removal unit for removing moisture included in the fuel is arranged at a site between the fuel tank and the merge and discharge unit on the fuel supply route.

5. The device for supplying fuel to an engine as in claim 1, wherein:
   a cooling unit for cooling the fuel is arranged at a site between the merge and discharge unit and the filter on the fuel supply route.

6. A device for supplying fuel to an engine, the fuel supply device comprising:
   a fuel tank;
   a fuel supply route for supplying to the engine fuel that has been collected in the tank;
   a filter provided to the fuel supply route;
   a first fuel pump provided downstream of the filter in a fuel supply direction on the fuel supply route;
   a merge and discharge unit for merging and discharging fuel, the merge and discharge unit being provided to a site between the fuel tank and the filter on the fuel supply route;
   a first fuel return route for returning the fuel of the engine to the merge and discharge unit; and
   a second fuel return route for returning to the fuel tank the fuel discharged from the merge and discharge unit;
   wherein:
   the merge and discharge unit has: a reservoir unit in which fuel can be collected; a first merge unit for merging into the reservoir unit the fuel from a site upstream of the merge and discharge unit on the fuel supply route; a second merge unit for merging into the reservoir unit the fuel from the first fuel return route; a first discharge unit for discharging a portion of the fuel in the reservoir unit to a site downstream of the merge and discharge unit on the fuel supply route; and a second discharge unit for discharging a remaining portion of the fuel in the reservoir unit into the second fuel return route, and
   a moisture removal unit for removing moisture included in the fuel, a second fuel pump, the merge and discharge unit, a cooling unit for cooling the fuel, a third fuel pump, the filter, and the first fuel pump are provided to the fuel supply route in the stated order from the upstream side in the fuel supply direction.

7. The device for supplying fuel to an engine as in claim 6, wherein:
   the amount of fuel discharged from the second discharge unit is less than the amount of fuel discharged from the first discharge unit.

8. The device for supplying fuel to an engine as in claim 7, wherein:
   in causing the amount of fuel discharged from the second discharge unit to be less than the amount of fuel discharged from the first discharge unit, a constricted site where the flow path cross-sectional area is less than that of the first discharge unit is provided to the second discharge unit, or a constricted site where the flow path cross-sectional area is less than that of the downstream site on the fuel supply route is provided to the second fuel return route.

9. The device for supplying fuel to an engine as in claim 6, wherein:
   the first merge unit, the second merge unit, and the first discharge unit of the merge and discharge unit are arranged in sites below the reservoir unit, and the second discharge unit is arranged at a site above the reservoir unit.

10. The device for supplying fuel to an engine as in claim 6, wherein:
    a moisture removal unit for removing moisture included in the fuel is arranged at a site between the fuel tank and the merge and discharge unit on the fuel supply route.

11. The device for supplying fuel to an engine as in claim 6, wherein:
    a cooling unit for cooling the fuel is arranged at a site between the merge and discharge unit and the filter on the fuel supply route.

* * * * *